United States Patent [19]

Campbell

[11] Patent Number: 4,516,157
[45] Date of Patent: May 7, 1985

[54] PORTABLE ELECTRONIC CAMERA

[76] Inventor: Malcolm G. Campbell, P.O. Box 8760, Ponsonby, Auckland, New Zealand

[21] Appl. No.: 546,194

[22] Filed: Oct. 27, 1983

[30] Foreign Application Priority Data

Nov. 23, 1982 [NZ] New Zealand .................. 202578
Jan. 13, 1983 [NZ] New Zealand .................. 203022

[51] Int. Cl.³ .............................................. H04N 7/18
[52] U.S. Cl. .................................. 358/108; 358/213; 358/209; 358/229
[58] Field of Search ............... 358/88, 93, 94, 103, 358/108, 109, 213, 209, 229, 91, 92; 179/107 S

[56] References Cited

U.S. PATENT DOCUMENTS

| | | | |
|---|---|---|---|
| 2,955,156 | 10/1960 | Heilig | 358/88 |
| 3,293,358 | 12/1966 | Ratliff, Jr. | 358/88 |
| 3,376,381 | 4/1968 | Ratliff, Jr. | 358/88 |
| 3,504,122 | 3/1970 | Ratliff, Jr. | 358/88 |
| 3,614,314 | 10/1971 | Rossier | 358/103 |
| 3,670,097 | 6/1972 | Jones | 358/88 |
| 3,784,738 | 1/1974 | Natter | 358/88 |
| 3,993,407 | 11/1976 | Moricca et al. | 358/94 |
| 4,214,267 | 7/1980 | Roese et al. | 358/88 |
| 4,310,849 | 1/1982 | Glass | 358/88 |
| 4,395,731 | 7/1983 | Schoolman | 358/88 |
| 4,398,799 | 8/1983 | Swift | 358/109 |

FOREIGN PATENT DOCUMENTS 56-42500 4/1981 Japan ........................... 179/107

Primary Examiner—John C. Martin
Assistant Examiner—Edward L. Coles
Attorney, Agent, or Firm—Young & Thompson

[57] ABSTRACT

A video recording device is arranged to be worn by the user like a pair of spectacles. In the recording mode, the scene in front of the user is recorded on a miniature television camera mounted on the spectacle frame (or two cameras if the recording is to be used for 3-D viewing). The miniature camera or cameras may be concealed within the spectacle frame, and allows the user to view the scene normally, and also to examine a view finder showing the portion of the scene available to the television camera. This enables the user to perform hands free photography and provides almost instantaneous recording of a scene as the act of looking at the scene points the camera and the view finder towards that portion of the scene to be captured. The device can be used to record moving pictures or still pictures as in an electronic still camera.

9 Claims, 7 Drawing Figures

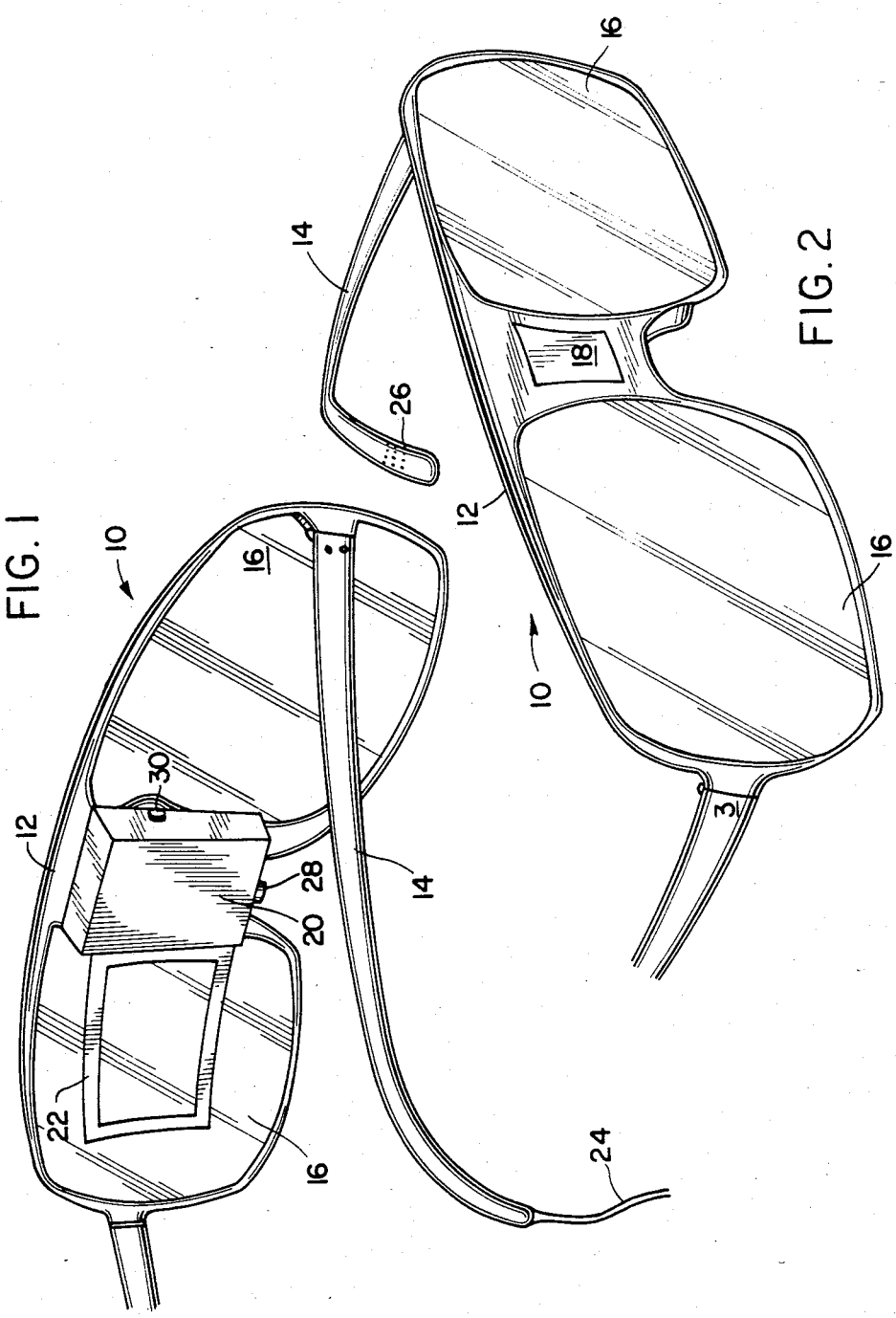

PORTABLE ELECTRONIC CAMERA

BACKGROUND OF THE INVENTION

This invention relates to portable electronic video recording devices.

In the past, video cameras have been bulky, and those in most widespread use have been hand-held or, in some cases, shoulder mounted. Such devices have been prone to producing shaky pictures as a result of the unsteadiness of the operator's hands. Also, it has been difficult to film a subject without that subject's being aware that he is being recorded. As a result, the subject tends to behave other than normally, due to self-consciousness.

PRIOR ART

Various proposals have been made to incorporate television viewing apparatus in association with a head mounted viewing device, so that the user's field of vision is obscured by a surrounding frame forcing the user to look directly at two separate television screens, thereby to create a stereoscopic viewing apparatus.

Examples of this include the following U.S. patent specifications: U.S. Pat. Nos. 2,955,156 (Heilig) 3,504,122 (Ratliff) 3,670,097 (Jones) 3,784,738 (Natter) 4,214,267 (Roese) 4,310,849 (Glass) U.S. Pat. No. 3,614,314 (Rossire) teaches a head up optical display for aircraft pilots with a system of mirrors enabling the pilot to view the real world simultaneously with the reception of information from television displays reflected from mirrors in front of the pilot's eyes for the purpose of viewing information not otherwise visible to the pilot.

U.S. Pat. No. 4,395,731 (Schoolman) teaches the combination of a pair of video cameras and video screens mounted on a user's head to provide a stereoscopic microscope for surgeons. In this arrangement, the surgeon cannot view the real world, but sees only the image displayed on the video screens directly in front of his eyes.

SUMMARY OF THE INVENTION

It is an object of the present invention to provide a readily portable electronic video recording device in which the electronic video signal substantially corresponds to what the operator sees directly.

Accordingly, the present invention broadly consists in an electronic video device comprising:
- (a) a pair of spectacles adapted to be worn on a user's head,
- (b) a view-defining means on the spectacles, through which the user can see the real world directly,
- (c) a video receptor associated with the spectacles, and arranged to create a video signal in accordance with the view seen by the user through the view-defining means of the spectacles, and
- (d) a transmitting means for transmitting the video signal from the receptor to a recording or display device (such as a monitor).

The view-defining means may comprise markings on either or both lenses of the spectacles, or there could be a liquid crystal display built into the spectacle lens(es) for indicating the current field of view of the video receptor.

The transmitting means may include a radio or other transmitter for transmitting the signal to a remote recording station, or it may simply comprise a conducting link between the receptor and an electronic recording medium adapted to be worn on the operator's body, or forming part of the spectacles themselves.

The recording device may make a permanent recording of the scene sensed by the receptor, or it may simply comprise a visual display device for somebody other than the operator of the device. There may, in fact, be two receptors, one for each eye frame of the spectacles, for recording a stereoscopic image.

There may also be one or more microphones within the sideframes of the spectacles.

Using present day technology the invention is made possible be the remote location of the CCD chip (charge coupled device) from the camera circuitry with which it is normally associated. This invention allows the spectacle frames to maintain the appearance of a normal pair of spectacles, while the comparatively bulky camera circuitry plus storage circuitry and devices, can be located elsewhere.

It will be appreciated however that with current advances in microchip technology, it will soon be possible to incorporate the whole camera circuitry (and eventually the storage circuitry and devices) in a chip the size of the present commercially produced CCD used in the prototype of this invention. Such advances will eventually provide the user with absolute freedom of movement.

BRIEF DESCRIPTION OF THE DRAWINGS

FIG. 1 is a rear perspective view of a video device of the present invention;

FIG. 2 is a front perspective view of the video device of FIG. 1;

DESCRIPTION OF THE PREFERRED EMBODIMENTS

Figures 3, 5:
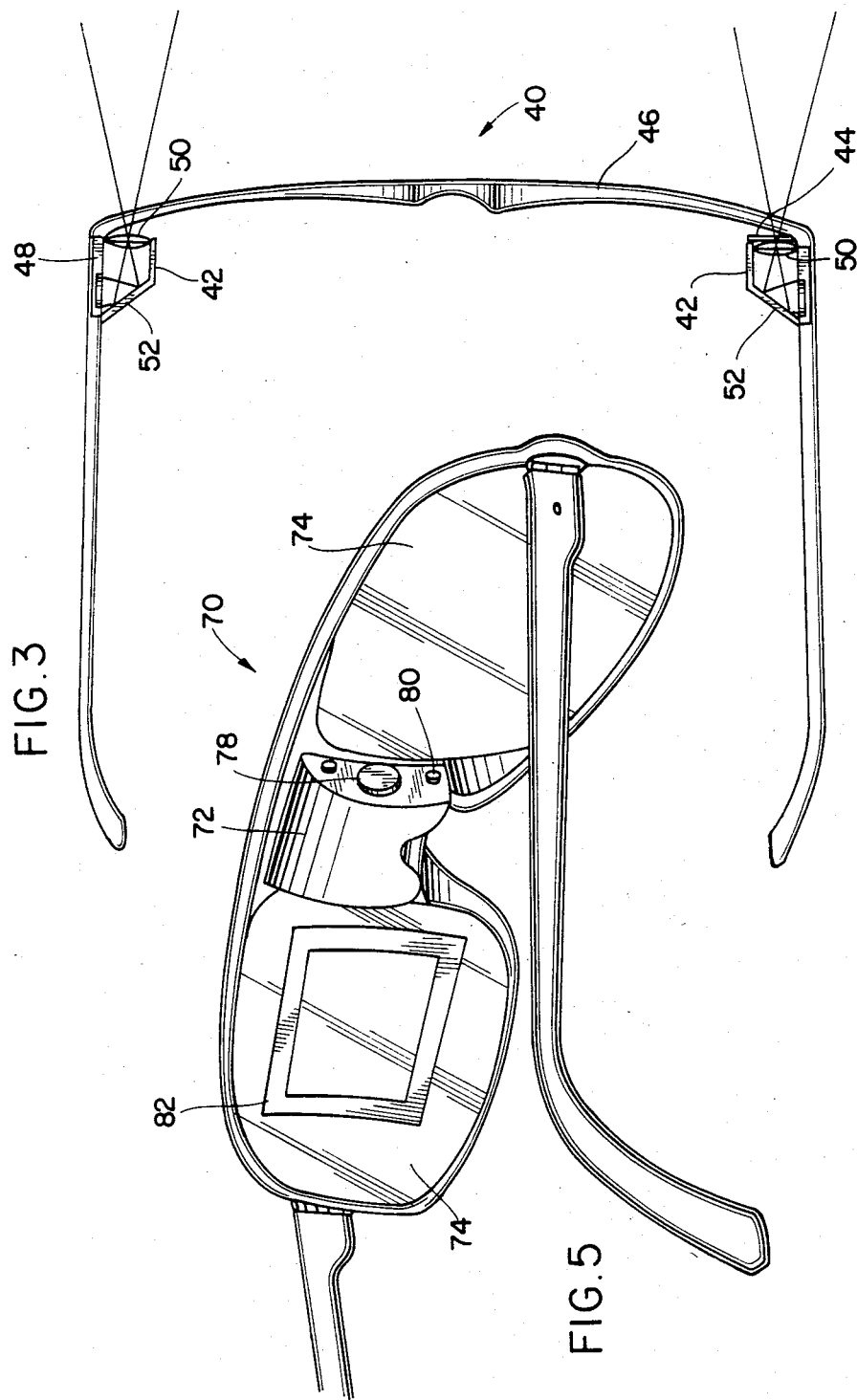
FIG. 3 is a diagrammatic plan view of an alternative video device of the present invention.
FIG. 5 illustrates an alternative camera of the present invention.

FIGS. 1 and 2 illustrate a video device 10 of the present invention. The device includes a pair of spectacles 12 with sideframes 14 and spectacle lenses 16. Between the spectacle lenses is a further lens 18, behind which is a miniature camera 20, typically a CCD device.

Mounted on one of the lenses 16 is a frame 22, which may comprise strips of tape or other marking. The frame serves as a view-defining means, or view finder. In other words, what the user sees through the frame when he is wearing the spectacles is the same as the field of view of the camera 20.

By providing the view finder 22 as a marking on one lens of the spectacles, marking out an area corresponding to the field of view of the camera, the view finder is invisible to other people as it is on the inside of the lens. The mirrored lens acts as a one way lens so that the marking cannot be seen by others. Surprisingly, the marking on one lens is effectively invisible to the wearer when both eyes are open. However, the user can see the view finder by closing his other eye, and the frame 22 then becomes apparent.

A convenient view finder is achieved by providing a self-adhesive matt frame which can be adhered to the inside of one of the lenses, corresponding to the camera's field of view when mounted before the user's eyes. It will be appreciated that different people's eyes are differently spaced, and the view should be adjusted to suit the user. It will be generally convenient to adjust the position of the view finder on the lens, rather than adjusting the receptor within the camera up or down. The view finder can be moved from side to side, or up and down, or the movement can be adjusted by the nose pads of the spectacles.

The self adhesive view finder is conveniently formed from a 4 mm wide strip of matt finish material which can be adhered to the inside of one of the lenses. Alternatively, an area of one lens 16 can be tinted, or a liquid crystal rectangle could appear on the lens. Other variations are possible.

The lenses 16 of the spectacles are preferably mirrored, in the fashion of sun glasses, so that the presence of the camera apparatus is concealed from others. By darkening or mirroring the lenses, the presence of a view finder frame 22 can be concealed from others. The presence of the camera lens is also preferably concealed either by design or by covering with the same material as the spectacle lenses.

The user places the spectacles on his head and faces towards the scene to be viewed by the camera. The video receptor within the camera generates an electronic signal in accordance with the scene before the user, as seen through the frame 22. The signal is conducted along a lead 24 to a video recorder or a radio or other transmitter on or near the user.

If desired, there may also be a microphone 26 within one of the sideframes, so that an audio signal accompanies the video signal being sent along the cable 24. The microphone may alternatively be at any other location on the spectacles, or elsewhere on or adjacent the user.

Underneath the camera there may be an aperture adjustment control 28, and on the side there may be an aperture indicator LED 30. The aperture control may comprise a sliding V (not shown) whose movement is controlled by screwing the aperture adjust screw 28. This is coupled to the LED 30, which is provided with circuitry so that it will be switched off if the incident light on the CCD is within its operating bandwidth, and will be switched on if the image is too dark, or will blink if too much light is reaching the CCD.

Figure 4:
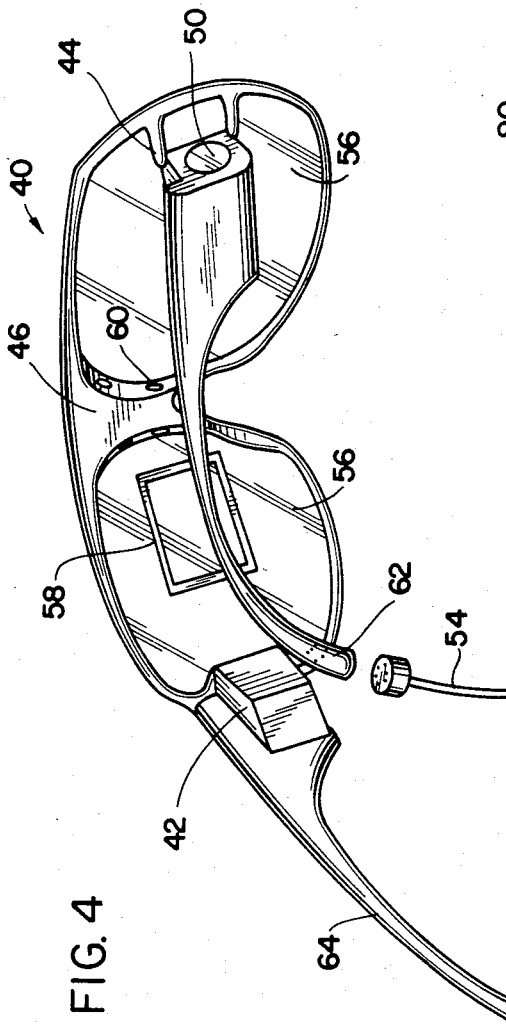
FIG. 4 is a perspective view of the camera of FIG. 3.

FIGS. 3 and 4 illustrate a second video device or camera unit 40 of the present invention. This device is similar to the device 10 of FIGS. 1 and 2, except that instead of a single mid-mounted camera there are two cameras 42, one adjacent each hinge 44 of a pair of spectacles 46. Each individual camera comprises a CCD chip 48 capable of receiving light and producing an electronic signal responsive to the image received by the charge-coupled optical device. The chip 48 is mounted behind a single element lens 50, typically a 16 millimeter F.2 wide angle lens, and a mirror 52.

The lens 50 has an aperture adjustment control on the underside thereof.

A lead 54 is connected to the frame of the spectacles and leads to a video tape recorder or transmitter, as described above.

The lenses 56 of the spectacles are preferably mirrored or darkened as described above.

A view finder frame 58 is still provided on one of the lenses 56 to act as a view-defining means.

An aperture indicator LED 60 may be provided on each side of the lens frame, one for each camera.

Stereophonic microphones 62 may be built into the side frames 64 of the spectacles.

FIG. 5 illustrates an alternative camera unit 70, similar to the unit 10. It incorporates one camera 72 between the lenses 74 of the spectacles. An aperture adjustment control knob 78, aperture indicator LED 80 and single view finder frame 82 are provided. Additional LED indicators 84 could be provided on the inside of the main frame to show Record, Battery low, Storage full, Zoom positions, and other functions.

If a zoom facility is required, this could be achieved electronically. The LED could inform the user of the zoom mode, as follows for instance:

OFF=no zoom,
SLOW BLINK=mild zoom,
THE FASTER THE BLINK=the stronger the zoom, until
FULL ON=full zoom.

For this function, it is preferred that the CCD have sufficient elements to provide an acceptable resolution in the zoom mode.

The camera unit need not have focal adjustment, provided that an optical les with a short focal length is used. Focal adjustment could be provided if required, in which case a simple focal screw could be introduced to adjust the lens. If it is desired that the focal screw adjustment be concealed, a small sliding lever could be fitted to the back of the frame. A focal indicator could also be provided, colour coded for instance and inserted alongside the CCD so as to be visible only to the user. Alternatively automatic focus can be achieved by electronic or other means.

The aperture could be controlled manually as described above, or could be controlled by a simple electronic method such as a liquid crystal device directly behind the camera lens. Alternatively, a CCD could be chosen with enough light acceptance band, so that the aperture function could be achieved via an automatic gain control circuit in the recording device.

Figure 6:
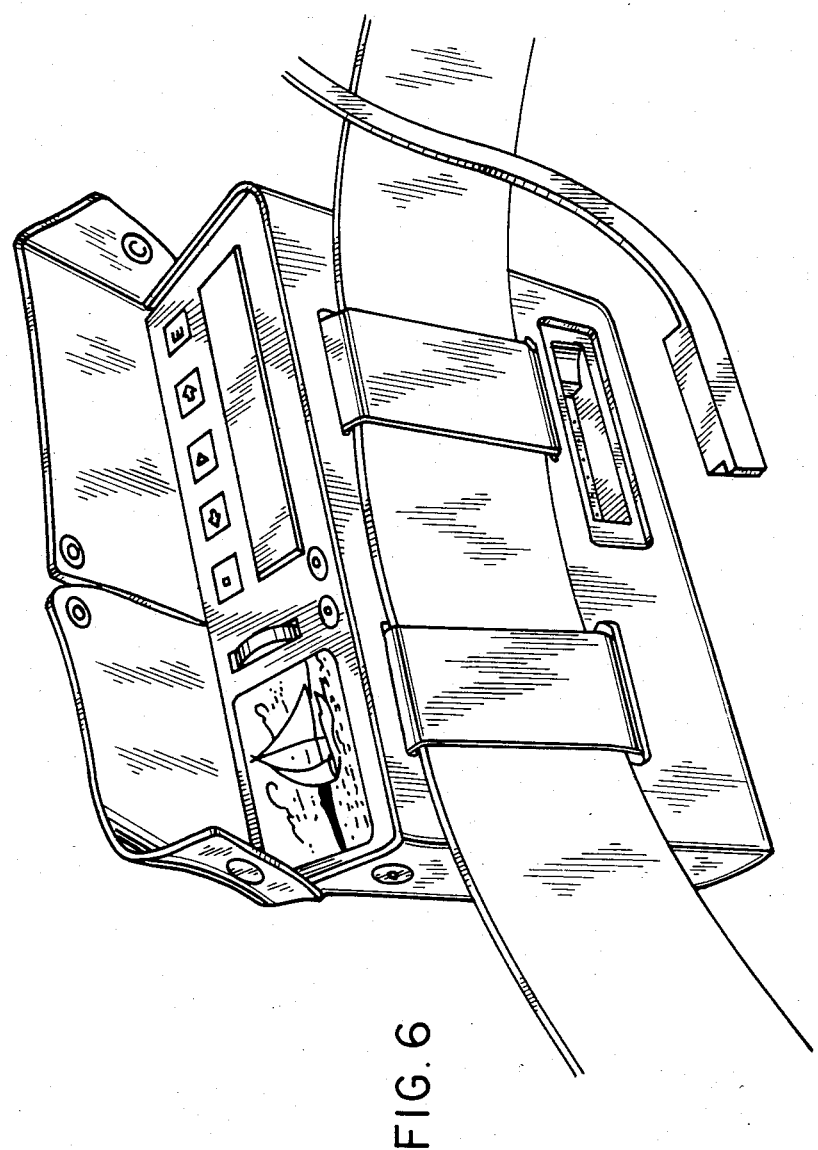
FIG. 6 illustrates a tape recorder for use with the present invention.

It is preferred that the video camera be connected to a recorder mounted on the user's person, and it is particularly preferred that the recorder be mounted on a belt, in such a manner as to be concealed, as shown in FIG. 6. The bulk of the recorder can be broken into two components for ease of wearing. For example, the batteries and camera circuitry can be provided in a separate container. The recorder can utilize a moving magnetic tape as presently used on video cameras, although it will be appreciated that the recording medium can be any other means of storing a signal from the CCD, including magnetic discs, digital electronic memories such as magnetic bubble memories, or other electronic memories.

The arrangement shown in FIG. 6 has flaps to conceal the deck from others, with the connections being on the inner side of the deck, and shoot and zoom controls concealed underneath the deck for ease of access. The components can be designed to appear as a traveller's money belt or the like so as not to appear as electronic circuitry.

For most uses, concealing the camera lens or lenses within spectacles, and concealing the recorder in components worn on a belt, will be the most suitable configuration. However, for some purposes, concealment may not be required; for instance where recording is carried out for training films or the like.

The means for transmitting picture information may involve a cable connecting the portable camera to an appropriate recorder, as shown, or may include an optical wave guide, or a radio, ultrasonic or other transmitter.

By this means the video receptor on the spectacles need not be directly coupled to the recorder or monitor of the signal.

For example, the spectacles may have a transmission device associated with it to transmit a signal containing picture information to a recorder mounted on the person's body, such as on a belt, or near him, as in a storage case in the same or adjacent room. For short distance transmission, it would be possible to use a relatively small transmitter transmitting picture information by a small radio transmitter, or ultrasonic or other sound emitter. The size and type of transmitter will depend upon the amount of picture information required to be transmitted. For example, in the case of an electronic still camera, there may be a small buffer memory associated with the portable camera which stores the information from a particular frame, and then transmits this information at a somewhat slower rate than the information is received in the buffer memory. This would enable a transmitter to use a smaller band width than a transmitter involved in transmitting live motion pictures. As it is possible to generate the picture information as a series of binary digits, it is possible to transmit the information as a series of on-off sound or radio pulses. Alternatively, an analogue signal can be used to transmit the information to the appropriate receiver.

In another example, the transmitter associated with the portable camera could transmit greater distances, or involve the used of a booster or relay transmitter close to the user. In either event, this could be transmitted to a distant receiver, or a monitor, or via a modem to a telephone line or via a satellite, or any other transmission device, to a distant receiver. The receiver at any point along the transmission chain could have an appropriate recorder associated with it to store the picture information, or the information could be processed live via a monitor as might be the case with live news TV broadcasts.

It will thus be appreciated that by transmitting the signal from the video receptor via any suitable transmitter to a receiver, it is possible to operate the portable camera in a relatively free and easy manner without being encumbered by wires or cables. Moreover, this enables the user more readily to conceal the presence of the camera and to record information received by the camera, as he will be able to record the scene he is looking at.

Figure 7:
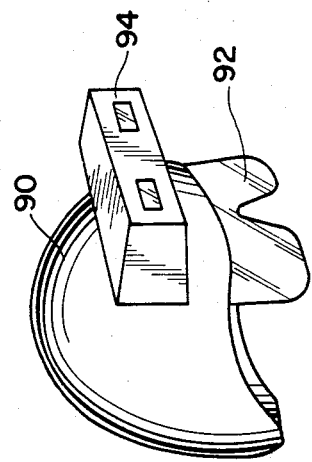
FIG. 7 illustrates a further alternative camera of the present invention.

FIG. 7 illustrates a further embodiment of a camera device of the present invention. In this embodiment a hat or helmet 90 is provided with a spectacle frame 92 extending down from the brim. A single or dual unit camera 94 is mounted upon the hat and aligned with a view finding arrangement on the spectacles.

In a modification of this embodiment, the hat 90 could be replaced by a simple head band or like arrangement. The spectacles 92 may be separate from the hat or head band, but will need to be aligned manually in use.

It will be appreciated that the concept of this invention involving the mounting of an electronic lens and a view finder on glasses, goggles or other spectacles, has a wide range of uses. Ordinary recording of a video tape or electronic still pictures can be carried out with a minimum of fuss and without encumbering the hands. This makes it possible to operate the camera while skiing, driving, flying, and so on. The invention also lends itself to the provision of do-it-yourself video training tapes. For example, an instructor could create a video tape of his own actions and instructions, so that a student watching the video would have the sensation of actually being there carrying out the instructor's actions. Other applications are in the industrial field, in providing training films, and in providing on-the-spot recording, as a camera for handicapped persons, and in the security and military fields where concealment is sometimes desirable.

Many configurations and combinations of features not specifically described above are possible and are envisaged to fall within the scope of the appended claims.

I claim:
1. An electronic video device comprising:
   (a) spectacle means adapted to be worn on a user's head and having a first field of view,
   (b) a view-defining means on the spectacle means, through which the user can see the real world directly, and having a second field of view smaller than said first field of view,
   (c) a video receptor associated with the spectacle means, and arranged to create a video signal in accordance with only said second field of view, and
   (d) a transmitting means for transmitting the video signal from the receptor to a recording or display device.

2. A device as claimed in claim 1 wherein the video receptor is mounted on the spectacle means.

3. A device as claimed in claim 1 wherein the video receptor is adapted to be worn on the user's head, separate from but aligned with the spectacle means.

4. A device as claimed in claim 1 further including a signal transmitter for transmitting the video signal to a remote receiving station.

5. A device as claimed in claim 1 further including a recording device adapted to be worn on the user's body.

6. A device as claimed in claim 1 comprising two said receptors arranged to provide a stereoscopic video signal.

7. A device as claimed in claim 1 further including a microphone for transmitting an electronic audio signal along with the video signal.

8. A device as claimed in claim 7 wherein there are two said microphones, one associated with each side frame of the spectacle means.

9. A device as claimed in claim 1 wherein said view-defining means provides the user with the image of a frame bordering said second field of view within said first field of view.

* * * * *